US005776838A

United States Patent [19]

Dellinger

[11] Patent Number: 5,776,838
[45] Date of Patent: Jul. 7, 1998

[54] BALLISTIC FABRIC

[75] Inventor: Allan Marcus Dellinger, Matthews, N.C.

[73] Assignee: Hoechst Celanese Corporation, Charlotte, N.C.

[21] Appl. No.: 808,134

[22] Filed: Feb. 28, 1997

Related U.S. Application Data

[63] Continuation of Ser. No. 593,643, Jan. 29, 1996, abandoned.

[51] Int. Cl.$^6$ .................................................. B32B 5/12
[52] U.S. Cl. ........................ 442/200; 442/199; 442/311; 442/318; 442/239
[58] Field of Search .............................. 442/199, 200, 442/311, 318, 239

[56] References Cited

U.S. PATENT DOCUMENTS

| | | | |
|---|---|---|---|
| 3,616,183 | 10/1971 | Brayford et al. | 161/175 |
| 3,998,988 | 12/1976 | Shimomai et al. | 428/400 |
| 4,079,161 | 3/1978 | Kile | 428/220 |
| 4,213,812 | 7/1980 | Boultinghouse | 156/226 |
| 4,309,487 | 1/1982 | Holmes | 428/516 |
| 4,916,000 | 4/1990 | Li et al. | 428/105 |
| 5,021,283 | 6/1991 | Takenaka et al. | 428/116 |
| 5,256,050 | 10/1993 | Davies | 425/131.5 |
| 5,318,735 | 6/1994 | Kozulla | 264/83 |
| 5,336,552 | 8/1994 | Strack et al. | 428/224 |
| 5,437,905 | 8/1995 | Park | 428/105 |
| 5,478,628 | 12/1995 | Billingsley et al. | 428/171 |
| 5,514,457 | 5/1996 | Fels et al. | 428/229 |
| 5,576,104 | 11/1996 | Causa et al. | 428/382 |

FOREIGN PATENT DOCUMENTS

| | | |
|---|---|---|
| 7-54229 | 2/1995 | Japan . |
| 6-105366 | 12/1995 | Japan . |
| WO 94/09336 | 4/1994 | WIPO . |

OTHER PUBLICATIONS

Polymers: Fibers and Textiles, A Compendium, John Wiley & Sons, NY, pp. 272, 285, 295, 1990.
The English translation of JP5-54229, 1995.
The English transaltion of JP7-316926, 1995.

*Primary Examiner*—Kathleen Choi
*Attorney, Agent, or Firm*—Walter M. Douglas

[57] ABSTRACT

In a ballistic fabric, the use of plurality of bicomponent fibers; the ballistic fabric is made from a plurality of bicomponent fibers and a plurality of high strength fibers. The bicomponent fibers have a sheath and a core, the sheath being made of a polymer having a melting point and the core being made of a polymer having a melting point. The sheath's melting point is less than the core's melting point. The fabric is bonded together using the sheath polymer of the bicomponent to the fibers of the fabric.

4 Claims, No Drawings

BALLISTIC FABRIC

This is a continuation of Ser. No. 08/593,643, filed Jan. 29, 1996, now abandoned.

FIELD OF THE INVENTION

The present invention is directed to the use of bicomponent fibers in a ballistic fabric.

BACKGROUND OF THE INVENTION

Ballistic fabrics are known. For example, see: U.S. Pat. Nos. 5,437,905; 4,916,000; 4,309,487; 4,213,812; and 4,079,161, and PCT Publication WO94/09336.

WO94/09336 discloses a ballistic fabric made from high strength filaments. The high strength filaments are defined as having a tenacity equal to or greater than about 7 grams/denier, a tensile modulus equal to or greater than about 150 grams/denier, and an energy-to-break equal to or greater than about 8 joules/gram. Filaments that meet these requirements include extended chain polyolefin filaments, polyvinyl alcohol filaments, polyacrylonitrile filaments, liquid crystalline polymer filaments, glass filaments, carbon filaments, and mixtures thereof.

U.S. Pat. No. 5,437,905 discloses a ballistic laminate structure. The structure is formed by a first array of unidirectional, high performance fibers and a second array of unidirectional, high performance fibers that are crossplied and bonded together in the absence of adhesives, bonding agents, or resins. Adherence between arrays is obtained by a thermoplastic sheet interposed between and melt fused to the arrays.

U.S. Pat. No. 4,916,000 discloses a ballistic composite having one or more layers. Each layer is made of high strength filaments that are held together in a matrix material. The high strength filaments have a tenacity of at least 7 grams/denier, a tensile modulus of at least 160 grams/denier, and an energy-to-break of at least 8 joules/gram. The matrix material is coated on the fibers.

U.S. Pat. Nos. 4,309,487; 4,213,812; and 4,079,161 disclose a laminate armor. The armor is formed by a first array of unidirectional, high molecular weight polyolefin fibers and a second array of unidirectional, high molecular weight polyolefin fibers that are crossplied and bonded together in the absence of adhesives, bonding agents, or resins. The polyolefin fibers are fused together by heat and pressure.

The foregoing ballistic fabrics/armor, while providing good protection, are difficult, and therefore expensive, to manufacture. Accordingly, new, and less expensive, ways of obtaining the same, or better, ballistic performance are needed.

SUMMARY OF THE INVENTION

In a ballistic fabric, the use of plurality of bicomponent fibers; the ballistic fabric is made from a plurality of bicomponent fibers and a plurality of high strength fibers. The bicomponent fibers have a sheath and a core, the sheath being made of a polymer having a melting point and the core being made of a polymer having a melting point. The sheath's melting point is less than the core's melting point. The fabric is bonded together using the sheath polymer of the bicomponent fiber.

DESCRIPTION OF THE INVENTION

A ballistic fabric refers to ballistic resistant articles. Ballistic resistant articles include: bullet proof vests, helmets, structural members of helicopter and other military or law enforcement equipment, vehicle panels, briefcases, raincoats, and the like. The ballistic fabrics may be laid-up or plied or laminated together to form multilayered structures. These fabrics may be used to form soft or pliable armor, or rigid or stiff armor. Further examples of ballistic fabrics, ballistic resistant articles and other articles made therefrom are found in PCT Publication WO94/09336; and U.S. Pat. Nos. 5,437,905; 4,916,000; 4,309,487; 4,213,812; and 4,079,161. Each of the foregoing is incorporated herein by reference.

Fabric refers to a structure made from fibers. Preferably, a fabric is a woven or knitted structure.

Bicomponent fibers are also known as heterofilaments, conjugate fibers, sheath/core fibers, and composite fibers. Typically, bicomponent fibers have a sheath and a core. The material of the sheath differs from the material of the core. The difference may arise from not only the chemical composition of the polymer or polymers making up the sheath and the core, but may arise from the physical properties of these materials. In the instant invention, the polymer forming the sheath has a lower melting temperature than the polymer forming the core. Examples of bicomponent fibers are set forth in U.S. Pat. Nos. 3,616,183; 3,998,988; and 5,256,050. Each is incorporated herein by reference. Bicomponent fibers are commercially available from Hoechst Celanese Corporation of Charlotte, N.C.

High strength fibers refer to any fiber having a modulus greater than or equal to 150 grams/denier and tenacity greater than or equal to 6 grams/denier. High strength fibers are selected from the group consisting of extended chain polyethylene filaments, extended chain polypropylene filament, polyvinyl alcohol filament, polyacrylonitrile filament, liquid crystal filament, glass filament, carbon filament, and mixtures thereof. Further information about these high strength fiber is found in PCT Publication WO94/09336 which is incorporated herein by reference. High strength fibers are commercially available under the following tradenames: VECTRAN; TREVAR; and CERTRAN from Hoechst Celanese Corporation of Charlotte, N. C.; KEVLAR from DuPont of Wilmington, Del.; SPECTRA from AlliedSignal Corporation of Petersburg, Va.; DYMEMMA from DSM Corporation of Heerlen, The Netherlands; TWARON from Akzo Nobel of Arnhem, The Netherlands TECHNORA from Osaka and Tokyo, Japan. The preferred high strength fiber is VECTRAN.

The ballistic fabric is preferably made by weaving or knitting yarns of the bicomponent fiber and the high strength fibers together. Sufficient bicomponent fibers should be used, so that the sheath material may bond all the fibers together effectively. The yarns may consist of the bicomponent fibers or high strength fibers or commingled bicomponent fibers and high strength fibers.

Bonding refers to the process by which the sheath melts or softens, flows around or to neighboring fibers, resolidifies on or around those neighboring fibers, and thereby adheres the fibers of the fabric together. Bonding may also be referred to as fusing or adhering. Preferably, bonding is accomplished by the application of heat and pressure to the fabric. The heat and pressure are chosen so that the sheath material will flow and cover neighbor fibers effectively. Bonding is accomplished without the use of any additional resins or matrix materials, although it may be necessary to coat the high strength fibers with materials to facilitate adherence of the sheath polymer.

A ballistic fabric (25(warp)×24(fill) plain weave; a 900 denier VECTRAN® HS fiber as the warp and a 1000 denier bicomponent polyethylene (20% sheath/80% core)) was compared to a ballistic fabric 728 from Hexcel Corporation, Dublin, Calif. (17×17 plain weave using 1500 denier KEVLAR in the warp and the fill) by the V-50 TEST performed by the H. P. White Company of Street, Md. Results from the test indicate that the inventive fabric is superior.

The present invention may be embodied in other specific forms without departing from the spirit or essential attributes thereof and, accordingly, reference should be made to the appended claims, rather than to the foregoing specification, as indicateing the scope of the invention.

I claim:

1. A ballistic fabric, comprising plies of woven or knitted high strength fibers and woven or knitted bicomponent fibers, said high strength fibers have a modulus greater than or equal to 150 grams/denier and a tenacity greater than or equal to 6 grams/denier, said bicomponent fibers comprise a sheath and a core, said sheath being made of a polymer having a melting point and said core being made of a polymer having a melting point less than said melting point of said core, wherein said bicomponent fibers and said high strength fibers are bonded together by said sheath polymer to form a ballistic resistant fabric.

2. The ballistic fabric of claim 1 wherein said high strength fibers are selected from the group consisting of extended chain polyethylene filaments, extended chain polypropylene filament, polyvinyl alcohol filament, polyacrylonitrile filaments, liquid crystal filaments, glass filaments, carbon filaments and combinations thereof.

3. A process for using a plurality of woven or knitted yarns containing woven or knitted bicomponent fibers, said bicomponent fibers each comprise a sheath polymer and a core polymer, wherein said sheath polymer has a melting point less than said core polymer, said yarns contain high strength fibers, wherein said high strength fibers have a modulus greater than or equal to 150 grams/denier and a tenacity greater than or equal to 6 grams/denier; said process comprising, weaving or knitting said yarns together; and bonding said fibers with said bicomponent fibers to form a woven or knitted ballistic resistant structure.

4. The process of claim 3 wherein said structure is contained in an article selected from the group consisting of a bullet proof vest, a helmet, a structural member of helicopter or law enforcement equipment, a vehicle panel, a briefcase, and a raincoat.

* * * * *